(12) United States Patent
Guo et al.

(10) Patent No.: US 12,113,448 B2
(45) Date of Patent: Oct. 8, 2024

(54) ZERO-VOLTAGE-SWITCHING FLYBACK CONVERTER WITH REDUCED SECONDARY SIDE CURRENT AND VOLTAGE STRESS

(71) Applicant: DIALOG SEMICONDUCTOR (UK) LIMITED, London (GB)

(72) Inventors: Huaming Guo, Campbell, CA (US); Yi Xu, Campbell, CA (US); Zhaowu Luo, Campbell, CA (US); Yongcai Lai, Campbell, CA (US); Jianming Yao, Campbell, CA (US)

(73) Assignee: DIALOG SEMICONDUCTOR (UK) LIMITED, London (GB)

( * ) Notice: Subject to any disclaimer, the term of this patent is extended or adjusted under 35 U.S.C. 154(b) by 434 days.

(21) Appl. No.: 17/443,890

(22) Filed: Jul. 28, 2021

(65) Prior Publication Data
US 2022/0038020 A1 Feb. 3, 2022

Related U.S. Application Data

(60) Provisional application No. 63/057,859, filed on Jul. 28, 2020.

(51) Int. Cl.
*H02M 3/335* (2006.01)
*H02M 1/00* (2006.01)

(52) U.S. Cl.
CPC ..... *H02M 3/33592* (2013.01); *H02M 1/0058* (2021.05)

(58) Field of Classification Search
CPC .......... H02M 3/33592; H02M 1/0058; H02M 1/0025; H02M 1/342; Y02B 70/10
See application file for complete search history.

(56) References Cited

U.S. PATENT DOCUMENTS

| | | | |
|---|---|---|---|
| 9,124,182 B2* | 9/2015 | Chen | H02M 1/34 |
| 10,784,789 B1* | 9/2020 | Nasir | H02M 1/08 |
| 2020/0220465 A1* | 7/2020 | Koo | H02M 3/3353 |
| 2021/0119526 A1* | 4/2021 | Chung | H02M 3/33523 |
| 2022/0006393 A1* | 1/2022 | Wong | H02M 3/33592 |

* cited by examiner

*Primary Examiner* — Shawki S Ismail
*Assistant Examiner* — Htet Z Kyaw
(74) *Attorney, Agent, or Firm* — .Haynes and Boone, LLP

(57) ABSTRACT

A flyback converter is provided in which either auxiliary winding or the primary winding is split into two windings. In this fashion, a different turn ratio is presented to the secondary winding during the transformer reset period as compared to when an active-clamp transistor or a ZVS switch transistor is switched on.

20 Claims, 8 Drawing Sheets

ZERO-VOLTAGE-SWITCHING FLYBACK CONVERTER WITH REDUCED SECONDARY SIDE CURRENT AND VOLTAGE STRESS

CROSS REFERENCE TO RELATED APPLICATIONS

The present application claims the benefit of U.S. Provisional Application No. 63/057,859 filed Jul. 28, 2020, the contents of which are incorporated by reference herein.

TECHNICAL FIELD

This application relates to switching power converters, and more particularly to flyback converters with zero-voltage switching.

BACKGROUND

Conventional zero-voltage-switching (ZVS) flyback converters may have a primary-side ZVS switch transistor in series with an auxiliary winding and in series with a ZVS (auxiliary) capacitor. An example conventional ZVS flyback converter 100 is shown in FIG. 1. During an on-time of a power switch transistor M1, a primary winding current Ipri flows through a primary winding W1 of a transformer T and through the power switch transistor M1 to ground. An input voltage as supported by an input capacitor Cin provides the power to drive the primary winding current Ipri during the on-time of the power switch transistor M1. While the power switch transistor M1 is on, a secondary-side synchronous rectifier (SR) switch transistor is off to prevent a secondary winding current Isec from conducting in a secondary winding W2 of the transformer T. After the power switch transistor M1 cycles off, the SR switch transistor switches on so that the stored magnetic energy in the transformer T can drive the secondary winding current Isec to charge an output capacitor Cout with the output voltage.

In a discontinuous mode (DCM) of operation, the secondary winding current declines to zero before the power switch transistor M1 is again cycled on. In contrast, the secondary winding current is still flowing when the power switch transistor M1 is cycled on in a continuous conduction mode (CCM) of operation. During DCM operation, the drain-to-source voltage (VDS) of the power switch transistor M1 resonantly oscillates after the power switch transistor M1 is switched off. A ZVS switch transistor in series with an auxiliary winding Waux and an auxiliary capacitor Caux may be switched on during this resonant oscillation as shown in the timing diagram of FIG. 2. The ZVS switch transistor switches on from a time t0 to a time t1 after the power switch transistor M1 has been switched off. From time t1 to a time T2, the drain-to-source voltage VDS of the power switch transistor M1 declines due to the resonance between a magnetizing inductance Lm of the transformer and the parasitic capacitance of the power switch transistor M1. This resonant decline forces the drain-to-source voltage VDS to equal to or nearly equal to 0 V at time t2 so that there is zero voltage switching when the power switch transistor M1 is again switched at time t2. The power switch transistor M1 stays on from time t2 to a time t3. The primary winding current ($I_{PRI}$) ramps up from zero amps during this power switch transistor on-time. In response to the cycling off of the power switch transistor M1 at time t3, the secondary-side synchronous rectifier (SR FET) switch transistor is then switched on. This causes the secondary-winding current (ISEC) to jump high in amplitude and then begin declining. The SR switch transistor stays on until a time t4 when the secondary-winding current ISEC has ramped down to zero. Another ZVS power switching cycle may then repeat.

When the ZVS switch transistor cycles on at time t0, the auxiliary winding current ($I_{ZVS}$) begins ramping in a negative current direction. This negative conduction of the auxiliary winding current causes a minor positive ramping of the secondary-winding current ISEC during the ZVS switch transistor on-time period from time t0 to time t1. Since the SR switch transistor is off during this time, the secondary winding current ISEC must flow through the body diode of the SR switch transistor. This body diode conduction through the SR switch transistor wastes energy and can also stress the SR switch transistor. In addition, the resulting drain-to-source voltage across the SR switch transistor can fool the SR switch controller to switch on the SR switch transistor, resulting in an undesirable punch through in which both the power switch transistor M1 and the SR switch transistor may be on simultaneously. There is thus a need in the art for switching power converters with improved ZVS that provides reduced secondary-side current stress and secondary-side voltage stress.

SUMMARY

In accordance with a first aspect of the disclosure, a zero-voltage switching (ZVS) flyback converter is provided that includes: a transformer having a primary winding, a secondary winding, a first auxiliary winding, and a second auxiliary winding; an SR switch transistor in series with the secondary winding; a first diode; an auxiliary capacitor in series with the first auxiliary winding and the first diode, wherein the first diode is configured to allow a charging current to flow from a positive terminal of the first auxiliary winding into a positive terminal of the auxiliary capacitor and to prevent a current flow into the positive terminal of the first auxiliary winding; a second diode; and a ZVS switch transistor in series with the second auxiliary winding and the second diode, wherein the second diode is configured to allow a discharging current to flow from the positive terminal of the auxiliary capacitor through the second auxiliary winding while the ZVS switch transistor is on and to prevent a current flow through the second auxiliary winding while the charging current is conducting.

In accordance with a second aspect of the disclosure, a zero-voltage switching (ZVS) flyback converter is provided that includes: a transformer having a primary winding, a secondary winding, a first auxiliary winding, and a second auxiliary winding; an SR switch transistor in series with the secondary winding; a first diode; an auxiliary capacitor in series with the first auxiliary winding and the first diode, wherein the first diode is configured to allow a charging current to flow from a positive terminal of the first auxiliary winding into a positive terminal of the auxiliary capacitor; a second diode; and a ZVS switch transistor in series with the first auxiliary winding, the second auxiliary winding and the second diode, wherein the second diode is configured to allow a discharging current to flow from the positive terminal of the auxiliary capacitor through the first auxiliary winding and through the second auxiliary winding while the ZVS switch transistor is on.

In accordance with a third aspect of the disclosure, a method of operation for a ZVS flyback converter is provided that includes: switching on an SR switch transistor coupled to a secondary winding of a transformer for an SR switch transistor on-time period; charging an auxiliary capacitor to a peak voltage by conducting a charging current through a first auxiliary winding of the transformer responsive to the switching on of the SR switch transistor; and switching on a ZVS switch transistor for a ZVS switch transistor on-time period to cause the auxiliary capacitor to discharge from the peak voltage by conducting a discharging current from the auxiliary capacitor to ground through a second auxiliary winding of the transformer.

In accordance with a fourth aspect of the disclosure, an active-clamp flyback converter is provided that includes: a transformer having a primary winding, an auxiliary winding, and a secondary winding; an active-clamp capacitor; an input voltage rail coupled to a negative terminal of the first primary winding and to a negative terminal of the active-clamp capacitor; a power switch transistor coupled between a positive terminal of the first primary winding and ground; an active-clamp transistor coupled between the positive terminal of the primary winding and a negative terminal of the auxiliary winding, the auxiliary winding having a positive terminal coupled to a positive terminal of the active-clamp capacitor; and a diode coupled between the positive terminal of the primary winding and the positive terminal of the auxiliary winding.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

Figure 3A:
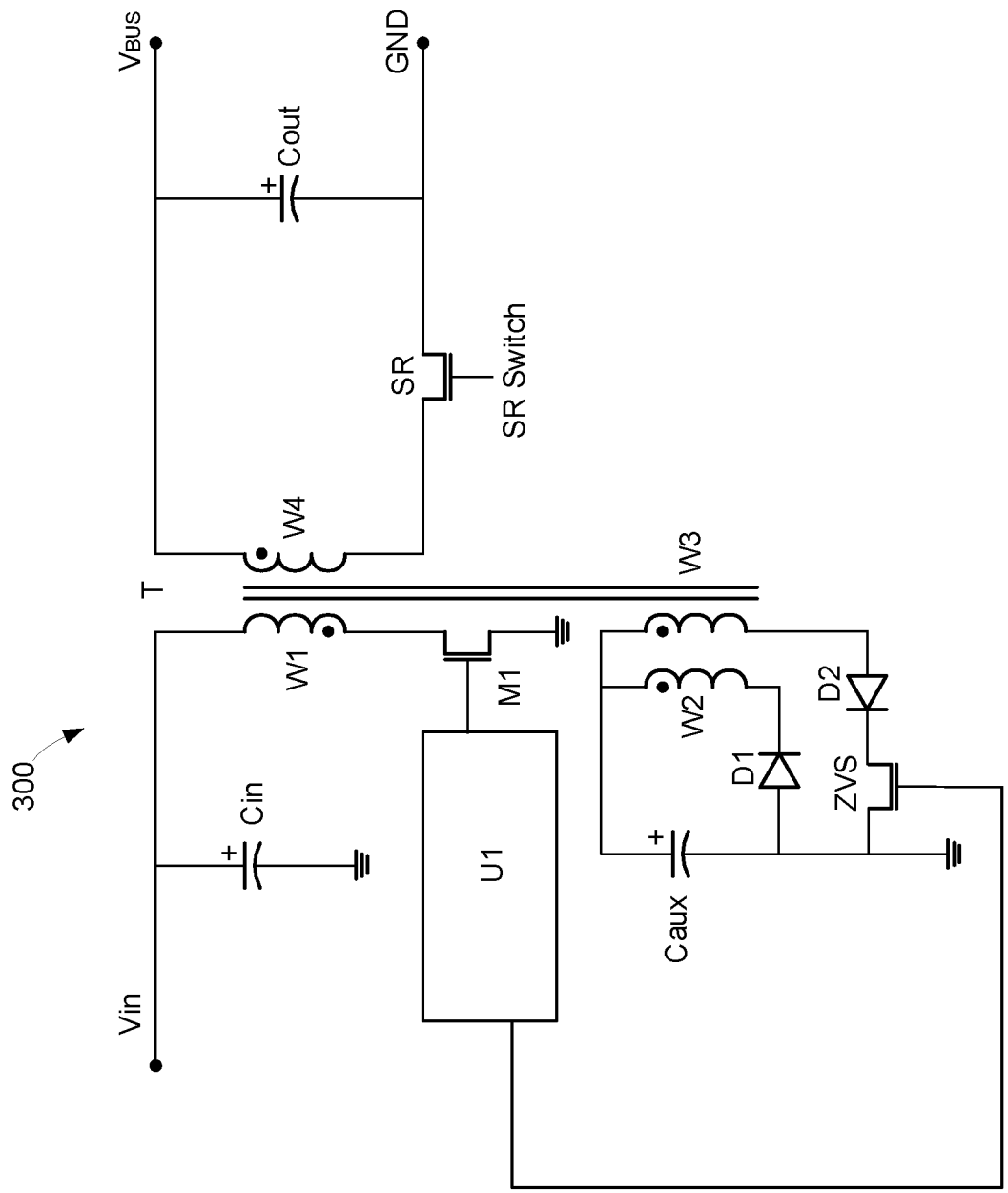
FIG. 3A illustrates a ZVS flyback converter with two auxiliary windings and an NMOS ZVS switch transistor in accordance with an aspect of the disclosure.

To reduce or eliminate the body-diode conduction in the SR switch transistor while the ZVS switch transistor is on, the auxiliary winding is bifurcated into two auxiliary windings W2 and W3 as shown for a ZVS flyback converter 300 of FIG. 3A. Auxiliary winding W2 may also be denoted as a first auxiliary winding whereas auxiliary winding W3 may be denoted as a second auxiliary winding. Flyback converter 300 includes a power switch transistor M1 coupled between a primary winding W1 of a transformer T and ground. A secondary-side synchronous rectifier (SR) switch transistor couples between the ground (GND) rail and a secondary winding W4 of the transformer T. Such an implementation may thus be denoted as a "low-side" SR switch transistor in that the SR switch transistor is on the ground rail. But in alternative implementations, a high-side SR switch transistor may be used that would be inserted into the output voltage (VBUS) rail coupled to the secondary winding W2. An input capacitor Cin supports an input voltage to the primary winding W1. Similarly, an output capacitor Cout supports the output voltage. As discussed for flyback converter 100, the SR switch transistor in flyback converter 300 is off while the power switch transistor M1 conducts to prevent a secondary winding current from conducting in the secondary winding W2. After the power switch transistor M1 cycles off, the SR switch transistor switches on so that the stored magnetic energy in the transformer T can drive the secondary winding current Isec to charge an output capacitor Cout with the output voltage.

An anode of a diode D2 connects to a negative terminal of the auxiliary winding W3 whereas a cathode of diode D2 connects to a drain of an NMOS ZVS switch transistor. As used herein, a positive terminal of a transformer winding is equivalent with the "dotted" terminal in the transformer dot convention whereas a negative terminal of a transformer winding is the un-dotted terminal. A source of the NMOS ZVS switch transistor couples to ground and also to a negative terminal of an auxiliary capacitor Caux. A positive terminal of the auxiliary capacitor couples to a positive terminal of the auxiliary winding W3 and to a positive terminal of the auxiliary winding W2. An anode of a diode D1 couples to the negative terminal of the auxiliary capacitor (and thus to the source of the NMOS ZVS switch transistor). A cathode of diode D1 couples to a negative terminal of the auxiliary winding W2. Diode D1 may also be denoted herein as a first diode whereas diode D2 may be denoted as a second diode.

A single controller U1 controls the cycling of the power switch transistor M1 and the NMOS ZVS switch transistor although separate controllers may be used in alternative implementations. The timing of the on-time for the ZVS switch transistor is known in the zero-voltage switching arts. Thus, controller U1 may function as a conventional ZVS switch on-time controller. This is advantageous in that no changes are necessary to the control of flyback converter 300 as compared to conventional ZVS flyback converter 100 yet the problems of the body-diode conduction in the SR switch transistor during the ZVS switch transistor on-time period are eliminated or abated. Moreover, the risk of the drain-to-source voltage on the SR switch transistor triggering an undesirable SR switch on-time from the ZVS switching is reduced. Diode D1 rectifies the current flow through the auxiliary winding W2. Similarly, diode D2 rectifies the current flow through the auxiliary winding W3. Both auxiliary windings W2 and W3 are magnetically coupled to the primary winding W1 and to the secondary winding W4 of the transformer T. As will be explained further herein, the number of turns for the auxiliary winding W3 may be greater than the number of turns for the auxiliary winding W2 such that the SR switch transistor body-diode-conducted secondary winding current during the ZVS switch transistor on-time period is reduced or eliminated yet the desired resonance is obtained after the ZVS switch transistor is turned off so that ZVS switching of the power switch transistor M1 is achieved.

Figure 3B:
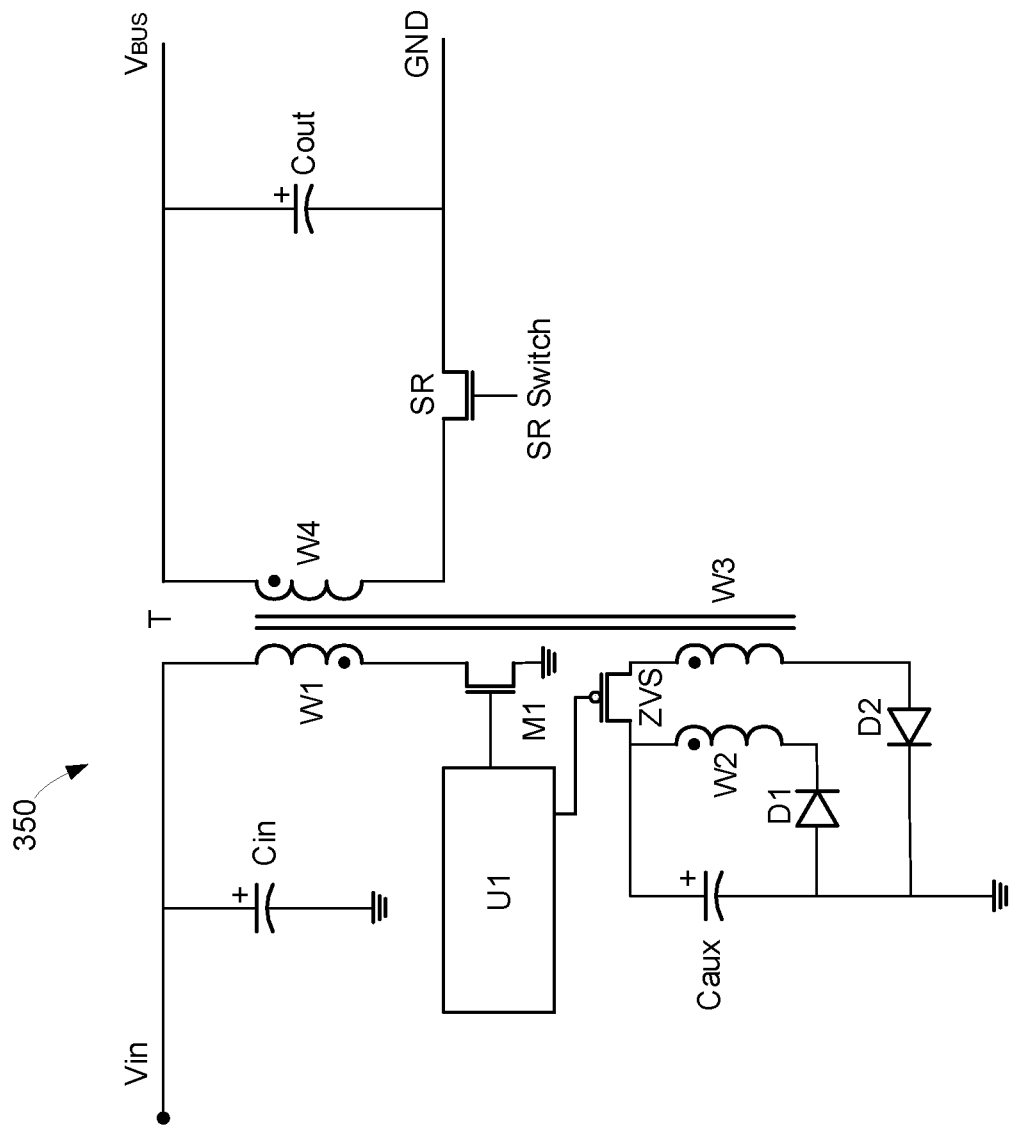
FIG. 3B illustrates a ZVS flyback converter with two auxiliary windings and a PMOS ZVS switch transistor in accordance with an aspect of the disclosure.

The ZVS switch transistor may also be a PMOS ZVS switch transistor as shown for a ZVS flyback converter 350 of FIG. 3B. Flyback converter 350 is arranged as discussed for flyback converter 300 except that the NMOS ZVS switch transistor is deleted and replaced by a PMOS ZVS switch transistor that couples between the positive terminals of auxiliary windings W2 and W3.

Figure 1:
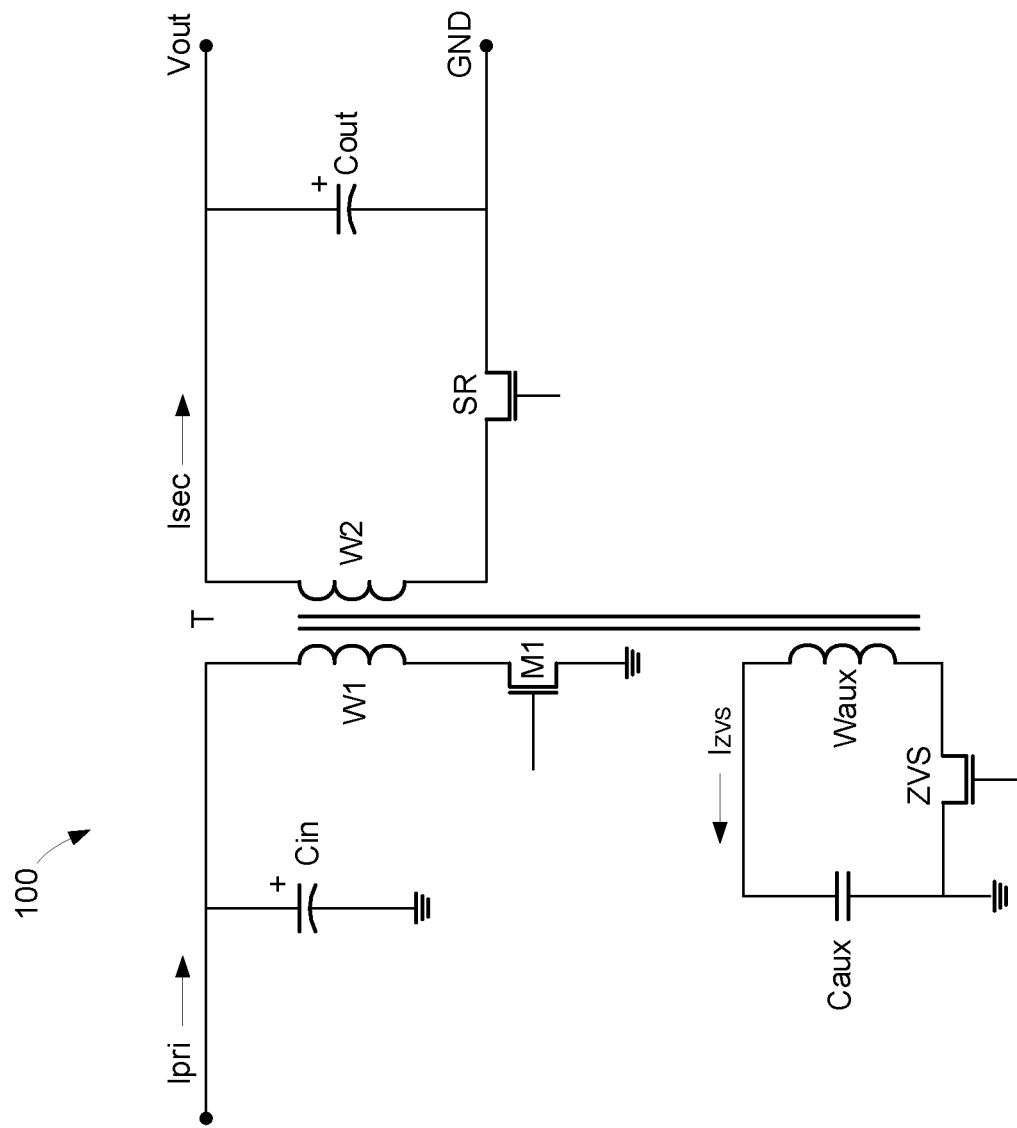
FIG. 1 illustrates a conventional ZVS flyback converter.
Figure 2:
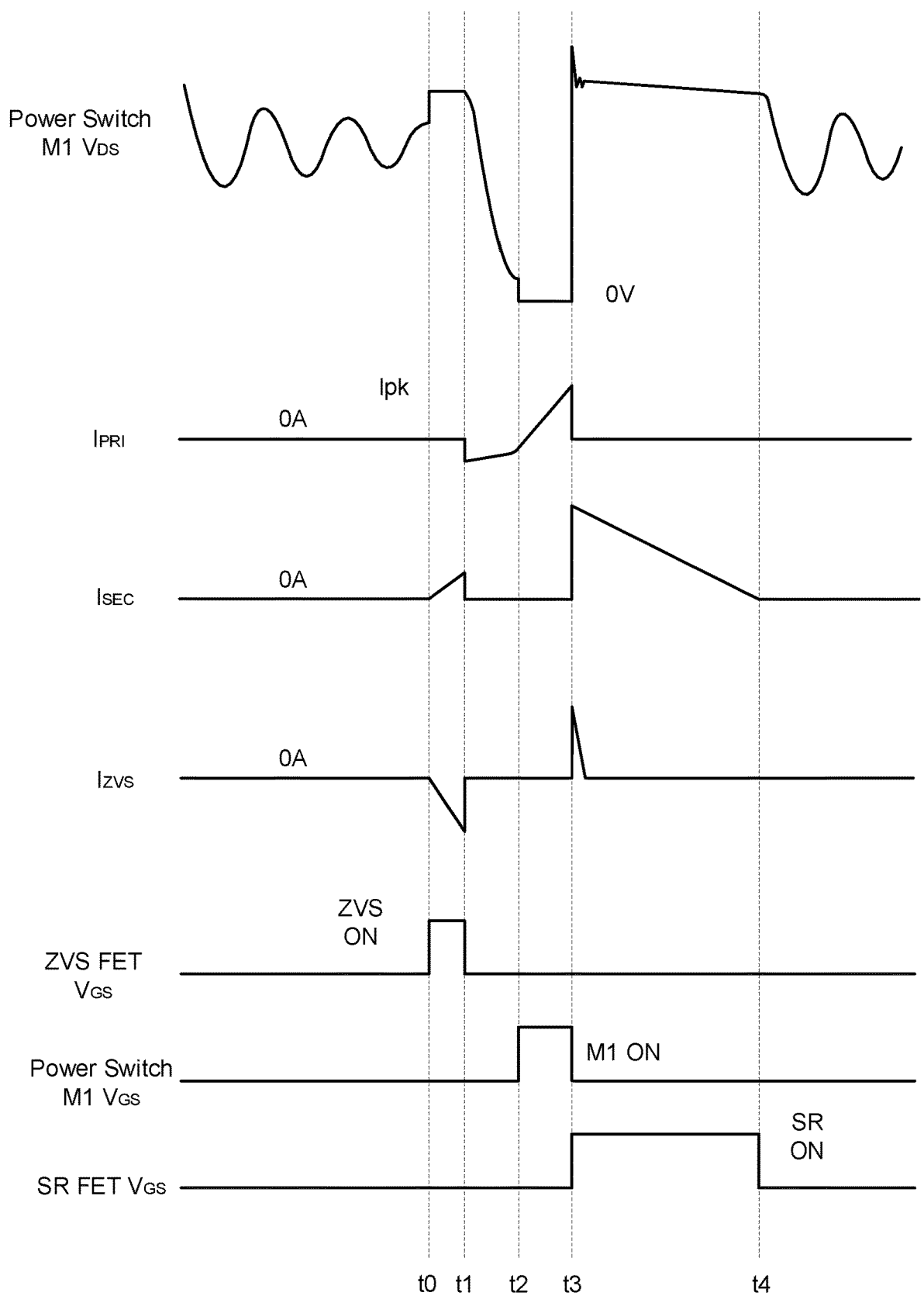
FIG. 2 is a timing diagram for operating waveforms of the conventional ZVS flyback converter of FIG. 1.
Figure 4:
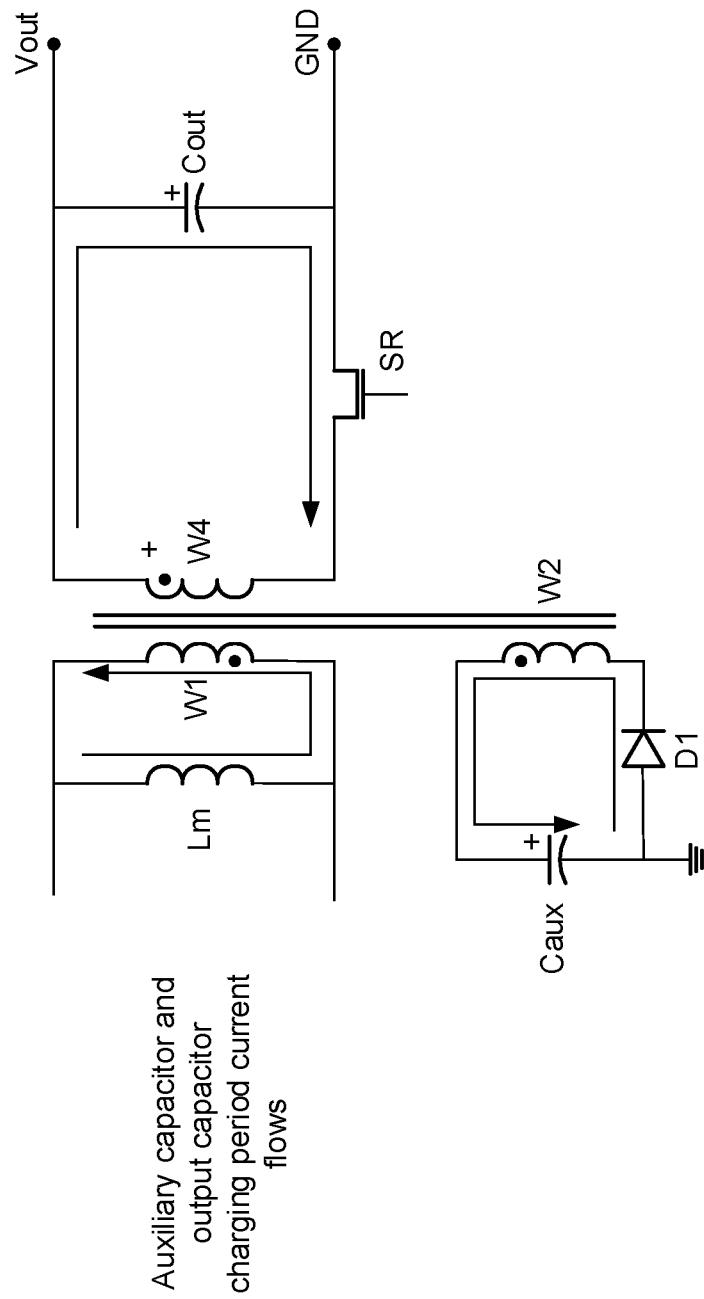
FIG. 4 illustrates a current flow in the ZVS flyback converter of FIG. 3A during an SR switch transistor on-time period.

Some operating theory will now be discussed. In the following discussion, it is assumed that the auxiliary winding W2 has N2 turns, the auxiliary winding W3 has N3 turns, and the secondary winding W4 has N4 turns. The ZVS switch transistor on-time for ZVS flyback converter 300 (or flyback converter 350) may be denoted as the auxiliary capacitor discharging stage. An auxiliary capacitor charging stage occurs during an initial portion of the SR switch transistor on-time period. In DCM operation, controller U1 switches on the ZVS switch transistor at the equivalent of time t0 to time t1 of FIG. 2. An auxiliary winding current flows during the SR switch transistor on-time period function to charge the auxiliary capacitor and the output capacitor are shown in FIG. 4 for flyback converter 300. Note that this auxiliary capacitor stage (and output capacitor charging stage) during the SR switch on-time period occurs both during DCM and CCM operation. In DCM operation, the SR switch on-time period may also be denoted as the transformer reset period. At the beginning of the transformer reset period, the SR controller (not illustrated) senses the current though the SR body diode and switches on the SR switch transistor to charge the output capacitor Cout with the output voltage Vout. At the same time, the magnetizing inductance Lm of the primary winding W1 causes a primary winding current W1 to flow into the input voltage rail. The auxiliary winding current W2 flows through diode D1, the auxiliary winding W2, and into the positive terminal of the auxiliary capacitor during the auxiliary capacitor charging portion of the SR switch transistor on-time period.

The conduction of the secondary winding current during the SR switch transistor on-time period causes the auxiliary winding W2 current to conduct so as to charge the auxiliary capacitor Caux to a peak voltage Vcaux during the auxiliary capacitor charging stage that may be expressed as follows:

$$Vcaux=(N2/N4)*Vout \quad \text{Eq. (1)}$$

where Vout is the output voltage for the flyback converter. Because there is no or very little load for the auxiliary capacitor and since it has a relatively small capacitance, the peak voltage Vcaux is normally charged higher than what Equation (1) predicts. In addition, the peak voltage Vcaux may be charged higher than this Equation (1) prediction by the power switch transistor M1 turn-off voltage spikes. Note also that the auxiliary capacitor is charged to its peak voltage Vcaux relatively early during the SR switch transistor on-time. The auxiliary capacitor will thus be charged to its peak voltage Vcaux before the end of the SR switch transistor on-time period. With the auxiliary capacitor charged to its peak voltage, the charging current that was flowing through the auxiliary winding W2 and into the positive terminal of the auxiliary capacitor stops conducting. The charging current thus conducts through the auxiliary winding W2 and into the positive terminal of the auxiliary capacitor only during the auxiliary capacitor charging portion of the SR switch transistor on-time period. This auxiliary capacitor charging portion begins when the SR switch transistor on-time period begins and typically ends well before the SR switch transistor on-time period ends.

Figure 5:
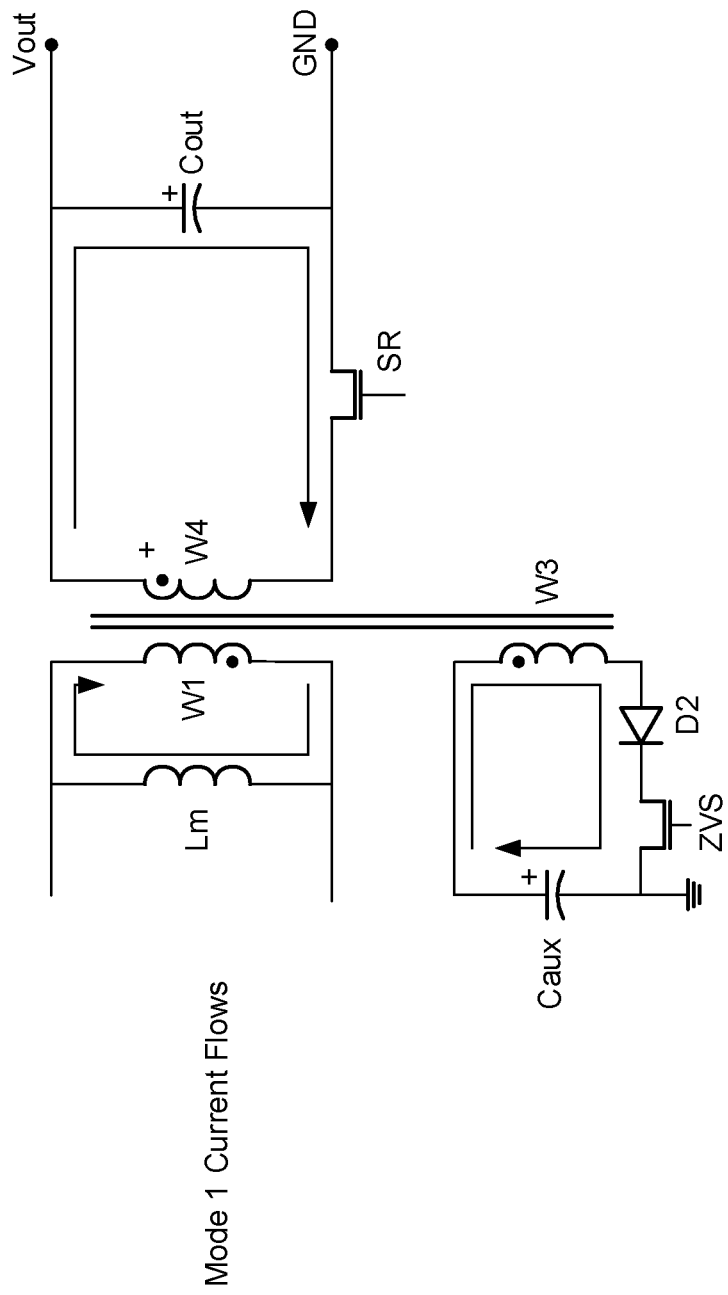
FIG. 5 illustrates a current flow in the ZVS flyback converter of FIG. 3A during a ZVS switch transistor on-time period.

An auxiliary capacitor discharge stage occurs during the ZVS switch transistor on-time period. During the discharge of the auxiliary capacitor, the auxiliary winding current W3 originates from the positive terminal of the auxiliary capacitor and conducts through the auxiliary winding W3, diode D2, and the ZVS switch transistor as shown for flyback converter 300 in FIG. 5. In CCM operation, the ZVS switch transistor on-time occurs during the SR switch transistor on-time period. The secondary winding current direction is thus shown as charging the output capacitor in FIG. 5. However, the secondary winding current flow through the SR switch transistor body diode is suppressed during the ZVS switch on-time period during DCM operation as will be discussed herein. During the ZVS switch transistor on-time period, the magnetizing inductance for the primary winding W1 drives the primary winding current in the opposite direction as occurs during the auxiliary capacitor charging period. Note that the auxiliary capacitor discharge current flow is the same for flyback converter 350 except that the current for auxiliary winding W3 flows through the PMOS ZVS switch transistor in that case. While the ZVS switch transistor is on, the auxiliary winding W3 current flows as the auxiliary capacitor discharges. A secondary winding voltage VW4 across the secondary winding W4 may then be expressed according to the following Equation (2):

$$VW4=(N4/N3)*Vcaux \quad \text{Eq. (2)}$$

Combining equations (1) and (2) gives:

$$VW4=(N2/N3)*Vout \quad \text{Eq. (3)}$$

By making N3 greater than N2, the secondary winding voltage VW4 is less than the output voltage Vout, which reduces (or even eliminates) the SR body diode conduction while the ZVS switch transistor conducts during DCM operation.

The auxiliary windings W2 and W3 may be arranged in a number of alternative implementations. For example, in an auxiliary winding configuration 600 shown in FIG. 6, diode D2, the auxiliary capacitor, and the ZVS switch transistor are arranged substantially as discussed for flyback converter 300. The anode of diode D1 again couples to the negative terminal of the auxiliary capacitor and also to ground. The cathode of diode D1 couples to the negative terminal of the auxiliary winding W2 and to the positive terminal of an auxiliary winding W3'. A negative terminal of auxiliary winding W3' couples to the anode of diode D2. The positive terminal of auxiliary winding W2 couples to the positive terminal of the auxiliary capacitor. During the SR switch transistor on-time period, the auxiliary winding current conducts through auxiliary winding W2 to charge the auxiliary capacitor as discussed for FIG. 4. But during the ZVS switch transistor on-time, the auxiliary winding current will conduct through the auxiliary winding W2 and auxiliary winding W3' as the auxiliary capacitor discharges. A serial combination of auxiliary winding W2 and auxiliary winding W3' thus functions as winding W3 during the ZVS switchon time in auxiliary winding configuration 600. The number of turns N3 for the serial combination of auxiliary windings W2 and W3' must of course be greater than the number of turns N2 for auxiliary winding W2. Auxiliary capacitor configuration 600 will thus achieve the reduction of body diode conduction in the SR switch transistor during the ZVS switch on-time period as discussed for flyback converters 300 and 350 because the resulting secondary winding voltage VW4 will be less than the output voltage Vout.

Figure 6:
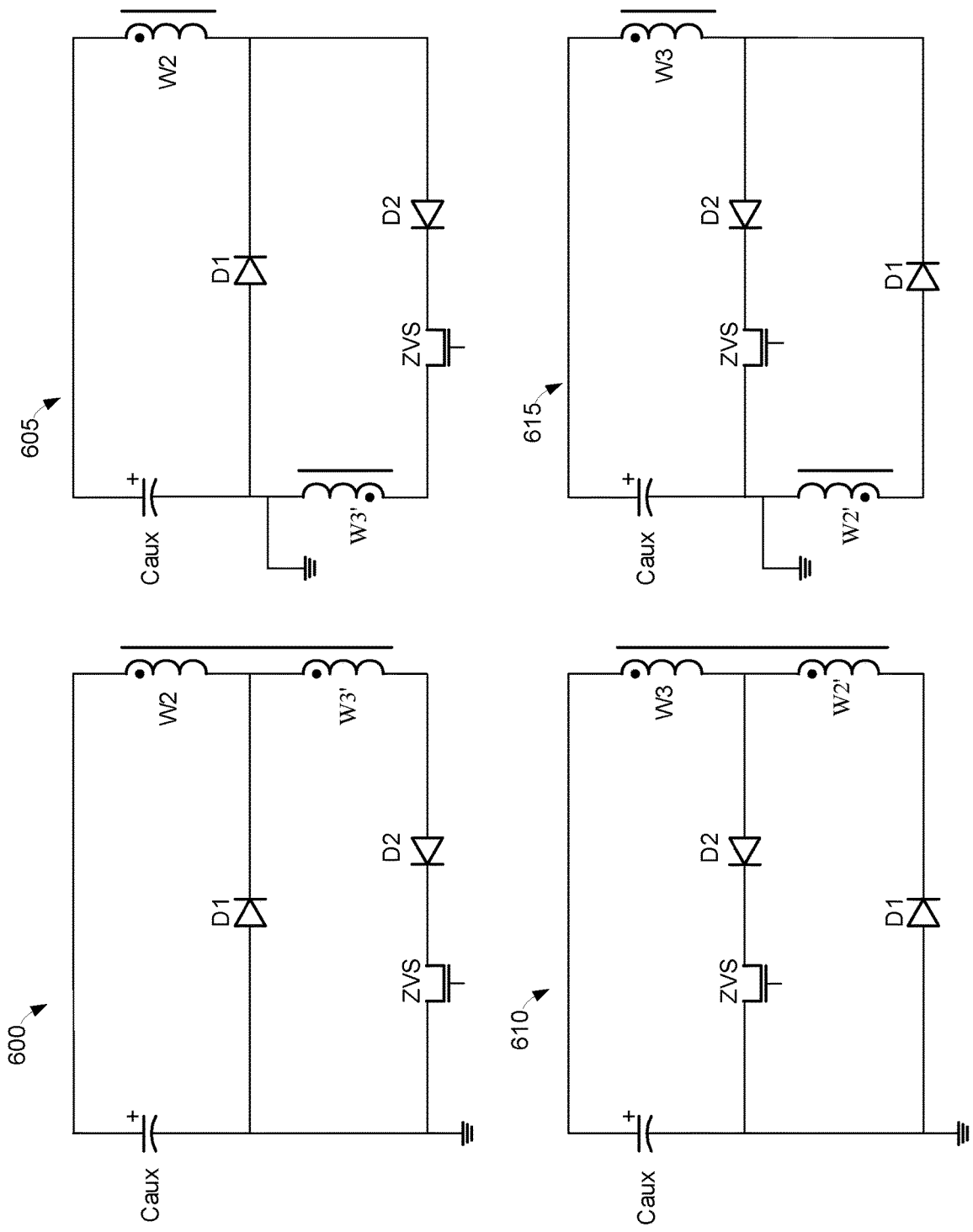
FIG. 6 illustrates some alternative implementations for a ZVS flyback converter with two auxiliary windings in accordance with an aspect of the disclosure.

An auxiliary capacitor configuration 605 is also shown in FIG. 6. Configuration 605 is similar to configuration 600 except that the positive terminal of the auxiliary winding W3' couples to the source of the ZVS switch transistor. The negative terminal of the auxiliary winding W3' couples to ground and to the negative terminal of the auxiliary capacitor. During the SR switch transistor on-time, the auxiliary winding current will conduct only through the auxiliary winding W2 and diode D1 to charge the auxiliary capacitor. But during the ZVS switch transistor on-time, the discharging of the auxiliary capacitor causes the auxiliary winding current to flow through auxiliary winding W2, diode D2, the ZVS switch transistor, and through the auxiliary winding W3'. A serial combination of the auxiliary windings W2 and W3' thus again functions as the auxiliary winding W3 during the ZVS switch transistor on-time in auxiliary winding configuration 605 as discussed for auxiliary winding configuration 600.

Rather than configure the auxiliary windings to reduce the body diode conduction in the SR switch transistor during DCM operation, the auxiliary windings may instead be configured so that the secondary winding is pulsed with a signaling voltage during the ZVS switch transistor on-time period in CCM operation. In this fashion, an SR controller may proceed to turn off the SR switch transistor during CCM operation in response to detecting the pulse of voltage on the secondary winding. The possibility of punch through that occurs when both the SR switch transistor and the power switch transistor are fully on is thus reduced. In such auxiliary winding configurations, the ZVS switch transistor is used for signaling instead of (or in addition to) producing 0 V across the power switch transistor M1 before the power switch transistor M1 is switched on. An example auxiliary winding configuration 610 for this CCM signaling is shown in FIG. 6. The positive terminal of the auxiliary capacitor couples to the positive terminal of auxiliary winding W3. A negative terminal of auxiliary winding W3 couples to the anode of diode D2. A cathode of diode D2 couples to a drain of the ZVS switch transistor. A source of the ZVS switch transistor couples to ground and the negative terminal of the auxiliary capacitor. During the ZVS switch transistor on-time period, the auxiliary capacitor will thus discharge through the auxiliary winding W3, diode D2, and the ZVS switch transistor to ground as discussed for flyback converters 300 and 350.

A positive terminal of an auxiliary winding W2' couples to the negative terminal of the auxiliary winding W3. An anode of diode D1 couples to ground whereas its cathode couples to a negative terminal of auxiliary winding W2'. During the auxiliary capacitor charging portion of the ZVS switch transistor on-time period, the auxiliary winding current will flow through diode D1 and through auxiliary windings W2' and W3 into the positive terminal of the auxiliary capacitor. A serial combination of auxiliary windings W2' and W3 in auxiliary winding configuration 610 thus functions as discussed for auxiliary winding W2 in flyback converters 300 and 350. The number of turns N2 will thus be greater than the number of turns N3 in auxiliary winding configuration 610. Although N2>N3 does not help reduce the body diode conduction during DCM operation as discussed for Equation (3), the resulting turns ratio helps the SR controller detect the resulting voltage pulse that is produced across the secondary winding by the switching on of the ZVS switch transistor.

An analogous winding configuration 615 is also shown in FIG. 6. The auxiliary capacitor, the ZVS switch transistor, diode D2, and auxiliary winding W3 are arranged as discussed for auxiliary winding configuration 610. A negative terminal of auxiliary winding W2' couples to ground whereas its positive terminal couples to the anode of diode D1. A cathode of diode D1 couples to the negative terminal of winding W3. The combination of auxiliary windings W3 and W2' will thus again function as winding W2 during the auxiliary capacitor charging portion of the ZVS switch transistor on-time period so that auxiliary winding configuration 610 is also useful for signaling the SR controller during CCM operation.

Figure 7:
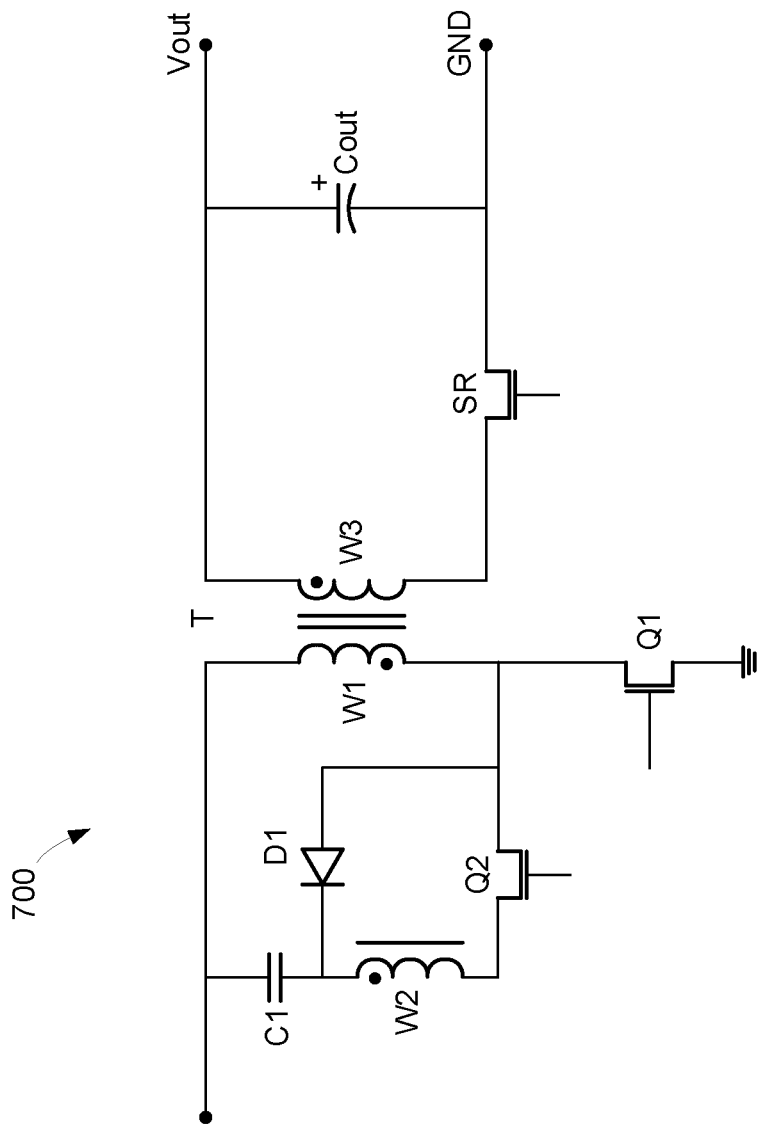
FIG. 7 illustrates an active-clamp flyback converter with two primary windings in accordance with an aspect of the disclosure.

A similar technique to reduce secondary-side stress (N3>N2) or for signaling (N2>N3) may be applied to an active-clamp ZVS flyback converter 700 as shown in FIG. 7. An active clamp transistor Q2 couples between a negative terminal of an auxiliary winding W2 and the drain of a power switch transistor Q1. A positive terminal of the auxiliary winding W2 couples through an active clamp capacitor C1 to the input voltage rail. An anode of a diode D1 couples to the drain of the power switch transistor Q1 whereas its cathode couples to the positive terminal of auxiliary winding W2 and to a positive terminal of the auxiliary capacitor. The primary winding is thus split into a primary winding W1 and auxiliary winding W2.

During the active clamp capacitor charging stage which occurs after the power switch transistor Q1 is turned off, diode D1 becomes forward biased so it conducts to charge the active clamp capacitor. The active clamp capacitor voltage is then charged to a peak voltage Vc_clamp that can be expressed by Equation (4):

$$Vc\_clamp = (N1/N3) * Vout \qquad \text{Eq. (4)}$$

where N1 and N3 are the number of turns for primary windings W1 and a secondary winding W3, respectively. Note that auxiliary winding W2 is bypassed by this active clamp charging current. The active clamp capacitor then discharges during the on-time for the active clamp switch transistor Q2. This discharge of the active clamp capacitor drives a negative current through the primary winding so that the drain voltage of the power switch transistor Q1 is discharged for zero voltage switching. The secondary winding voltage VW3 from this active clamp capacitor discharge can be expressed by Equation (5)

$$VW3 = Vc\_clamp * N3/(N1+N2) \qquad \text{Eq. (5)}$$

where N2 is the number of turns for the auxiliary winding W2. The turns ratio between the primary and secondary side of the transformer thus changes from the active clamp capacitor charging period to the active clamp capacitor discharging period. This is analogous to the change in the turns ratio for the auxiliary capacitor charging and discharging periods as discussed herein. Combining equations (4) and (5) gives:

$$VW3 = [N1/(N1+N2)] * Vout \qquad \text{Eq. (6)}$$

Since the secondary winding voltage VW3 is less than Vout during the active-clamp transistor on time, the stress at the secondary side is reduced and the SR body diode doesn't conduct. Without the SR body diode conducting, the undesired SR turn-on during auxiliary switch Q2 operation is also eliminated.

Those of some skill in this art will by now appreciate that many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A zero-voltage switching (ZVS) flyback converter, comprising:
   a transformer having a primary winding, a secondary winding, a first auxiliary winding, and a second auxiliary winding;
   an SR switch transistor in series with the secondary winding;
   a first diode;
   an auxiliary capacitor in series with the first auxiliary winding and the first diode, wherein the first diode is configured to allow a charging current to flow from a positive terminal of the first auxiliary winding into a positive terminal of the auxiliary capacitor and to prevent a current flow into the positive terminal of the first auxiliary winding;
   a second diode; and
   a ZVS switch transistor in series with the second auxiliary winding and the second diode, wherein the second diode is configured to allow a discharging current to flow from the positive terminal of the auxiliary capacitor through the second auxiliary winding while the ZVS switch transistor is on and to prevent a current flow through the second auxiliary winding while the charging current is conducting.

2. The ZVS flyback converter of claim 1, wherein the ZVS switch transistor is an NMOS switch transistor.

3. The ZVS flyback converter of claim 1, wherein the ZVS switch transistor is PMOS switch transistor.

4. The ZVS flyback converter of claim 1, further comprising:
   a power switch transistor coupled to the primary winding; and
   a primary-side controller for switching on the ZVS switch transistor during a DCM mode of operation after the power switch transistor has cycled off and before the SR switch transistor has cycled on to cause a voltage across the power switch transistor to discharge toward zero volts.

5. The ZVS flyback converter of claim 2, wherein a negative terminal of the auxiliary capacitor is coupled to ground, the positive terminal of the auxiliary capacitor is coupled to the positive terminal of the first auxiliary winding and coupled to a positive terminal of the second auxiliary winding, an anode of the first diode is coupled to ground, a cathode of the first diode is coupled to a negative terminal of the first auxiliary winding, an anode of the second diode is coupled to a negative terminal of the second auxiliary winding, a cathode of the second diode is coupled to a drain of the ZVS switch transistor, and a source of the ZVS switch transistor is coupled to ground.

6. The ZVS flyback converter of claim 2, wherein a negative terminal of the auxiliary capacitor is coupled to ground, the positive terminal of the auxiliary capacitor is coupled to a positive terminal of the first auxiliary winding and to a source of the ZVS switch transistor, a drain of the ZVS switch transistor is coupled to a positive terminal of the second auxiliary winding, an anode of the first diode is coupled to ground, a cathode of the first diode is coupled to a negative terminal of the first auxiliary winding, an anode of the second diode is coupled to a negative terminal of the second auxiliary winding, and a cathode of the second diode is coupled to ground.

7. The ZVS flyback converter of claim 1, wherein a number of turns for the first auxiliary winding is less than a number of turns for the second auxiliary winding.

8. The ZVS flyback converter of claim 1, further comprising:
   a primary-side controller for switching on the ZVS switch transistor while the SR switch transistor is on during CCM operation to signal to an SR controller to switch off the SR switch transistor.

9. The ZVS flyback converter of claim 8, wherein a number of turns for the first auxiliary winding is greater than a number of turns for the second auxiliary winding.

10. A zero-voltage switching (ZVS) flyback converter, comprising:
    a transformer having a primary winding, a secondary winding, a first auxiliary winding, and a second auxiliary winding;
    an SR switch transistor in series with the secondary winding;
    a first diode;
    an auxiliary capacitor in series with the first auxiliary winding and the first diode, wherein the first diode is configured to allow a charging current to flow from a positive terminal of the first auxiliary winding into a positive terminal of the auxiliary capacitor;
    a second diode; and
    a ZVS switch transistor in series with the first auxiliary winding, the second auxiliary winding and the second diode, wherein the second diode is configured to allow a discharging current to flow from the positive terminal of the auxiliary capacitor through the first auxiliary winding and through the second auxiliary winding while the ZVS switch transistor is on.

11. The ZVS flyback converter of claim 10, wherein the positive terminal of the auxiliary capacitor is coupled to the positive terminal of the first auxiliary winding, the second auxiliary winding has a positive terminal coupled to a negative terminal of the first auxiliary winding, the first diode has an anode coupled to a negative terminal of the auxiliary capacitor and has a cathode coupled to the negative terminal of the first auxiliary winding and to the positive terminal of the second auxiliary winding, and wherein the second diode is coupled between the ZVS switch transistor and a negative terminal of the second auxiliary winding.

12. The ZVS flyback converter of claim 11, wherein an anode of the second diode is coupled to a negative terminal of the second auxiliary winding, a cathode of the second diode is coupled to a drain of the ZVS switch transistor, and a source of the ZVS switch transistor is coupled to ground.

13. The ZVS flyback converter of claim 10, wherein the positive terminal of the auxiliary capacitor is coupled to the positive terminal of the first auxiliary winding, the second auxiliary winding has a negative terminal coupled to a negative terminal of the auxiliary capacitor and has a positive terminal coupled to a source of the ZVS switch transistor, and wherein the second diode is coupled between a drain of the ZVS switch transistor and a negative terminal of the first auxiliary winding.

14. The ZVS flyback converter of claim 13, wherein the first diode has an anode coupled to the negative terminal of the auxiliary capacitor and a cathode coupled to the negative terminal of the first auxiliary winding, and the second diode has an anode coupled to the negative terminal of the first auxiliary winding and a cathode coupled to a drain of the ZVS switch transistor.

15. A method of operation for a ZVS flyback converter, comprising:
   switching on an SR switch transistor coupled to a secondary winding of a transformer for an SR switch transistor on-time period;
   charging an auxiliary capacitor to a peak voltage by conducting a charging current through a first auxiliary winding of the transformer responsive to the switching on of the SR switch transistor; and
   switching on a ZVS switch transistor for a ZVS switch transistor on-time period to cause the auxiliary capacitor to discharge from the peak voltage by conducting a discharging current from the auxiliary capacitor to ground through a second auxiliary winding of the transformer.

16. The method of claim 15, wherein the switching on of the ZVS switch transistor causes a voltage across the secondary winding of the transformer to be less than an output voltage of the ZVS flyback converter.

17. The method of claim 15, wherein the charging of the auxiliary capacitor to the peak voltage also includes comprises conducting the charging current through the second auxiliary winding.

18. The method of claim 15, wherein the switching on a ZVS switch transistor for the ZVS switch transistor on-time period to cause the auxiliary capacitor to discharge from the peak voltage also includes conducting the discharging current through the second auxiliary winding.

19. An active-clamp flyback converter, comprising:
   a transformer having a primary winding, an auxiliary winding, and a secondary winding;
   an active-clamp capacitor;
   an input voltage rail coupled to a negative terminal of the primary winding and to a negative terminal of the active-clamp capacitor;
   a power switch transistor coupled between a positive terminal of the primary winding and ground;
   an active-clamp transistor coupled between the positive terminal of the primary winding and a negative terminal of the auxiliary winding, the auxiliary winding having a positive terminal coupled to a positive terminal of the active-clamp capacitor; and
   a diode coupled between the positive terminal of the primary winding and the positive terminal of the auxiliary winding.

20. The active-clamp flyback converter of claim 19, wherein the diode has an anode coupled to the positive terminal of the primary winding and a cathode coupled to the positive terminal of the auxiliary winding.

* * * * *